(12) United States Patent  (10) Patent No.: US 8,925,934 B2
Anderson  (45) Date of Patent: Jan. 6, 2015

(54) TORSION SLIDE SUSPENSION

(71) Applicant: Anderson Mfg., Inc., Camilla, GA (US)

(72) Inventor: Donald R. Anderson, Camilla, GA (US)

(73) Assignee: Anderson Mfg., Inc., Camilla, GA (US)

( * ) Notice: Subject to any disclaimer, the term of this patent is extended or adjusted under 35 U.S.C. 154(b) by 0 days.

(21) Appl. No.: 14/174,932

(22) Filed: Feb. 7, 2014

(65) Prior Publication Data

US 2014/0312581 A1   Oct. 23, 2014

Related U.S. Application Data

(60) Provisional application No. 61/762,306, filed on Feb. 7, 2013.

(51) Int. Cl.
B60G 17/00 (2006.01)
(52) U.S. Cl.
CPC .................................. B60G 17/00 (2013.01)
USPC .................... 280/6.151; 280/789; 414/482
(58) Field of Classification Search
USPC ........ 280/6.151, 656, 789; 414/482–485, 589
See application file for complete search history.

(56) References Cited

U.S. PATENT DOCUMENTS

| 2,025,263 | A |   | 12/1935 | Armer |
| 3,133,745 | A |   | 5/1964 | Granning |
| 3,356,386 | A | * | 12/1967 | Taylor ........................... 280/788 |
| 4,371,189 | A |   | 2/1983 | Raidel |
| 4,673,328 | A |   | 6/1987 | Shieis |
| 4,796,910 | A |   | 1/1989 | Star, Sr. |
| 4,934,733 | A | * | 6/1990 | Smith et al. ............ 280/124.132 |
| 5,630,693 | A | * | 5/1997 | Sobina ......................... 414/495 |
| 6,068,276 | A | * | 5/2000 | Kallstrom .............. 280/124.157 |
| 6,340,165 | B1 | * | 1/2002 | Kelderman ............ 280/124.153 |
| 7,108,271 | B2 |   | 9/2006 | Smith |
| 7,322,627 | B1 |   | 1/2008 | Nicholson |
| 7,347,436 | B1 |   | 3/2008 | Fawcett |
| 7,537,219 | B1 |   | 5/2009 | Sherwood |
| 7,618,227 | B2 | * | 11/2009 | Smith ........................... 414/484 |
| 7,775,529 | B2 | * | 8/2010 | Kinkaide ................... 280/6.153 |
| 8,113,526 | B2 |   | 2/2012 | Longley et al. |
| 8,191,922 | B2 |   | 6/2012 | Gabourie |
| 2012/0181760 | A1 |   | 7/2012 | Catford |

* cited by examiner

Primary Examiner — Paul N Dickson
Assistant Examiner — Robert A Coker
(74) Attorney, Agent, or Firm — Brian D. Bellamy

(57) ABSTRACT

A torsion slide suspension has a pair of polyethylene slides on each side of the suspension that is received in slide channels on a trailer frame. The torsion slide suspension has a rubber spring on top for bearing against the trailer frame and provides suspension to support the wheels of a ground level loading trailer.

1 Claim, 3 Drawing Sheets

US 8,925,934 B2

TORSION SLIDE SUSPENSION

PRIORITY CLAIM

This application claims priority of U.S. Provisional Patent Application 61/762,306 filed on Feb. 7, 2013.

BACKGROUND OF THE INVENTION

1. Field of the Invention

The present invention relates to suspension systems for ground level loading trailers and in particular to a torsion slide suspension apparatus for ground level loading trailers.

2. Description of the Prior Art

Ground level loading trailers, sometimes referred to as drop-bed trailers, mechanically lower the bed of a trailer to ground level to improve loading of machines, equipment and goods onto a trailer. These types of trailers are popular because one person can lower the trailer bed to load and unload cargo safely without having to disconnect the trailer from the tow vehicle and without requiring a ramp. With a ground level loading trailer, there are no winches, pulleys or ramps to deal with. Often, these trailers are used by persons who desire to drive their machine or vehicle onto the trailer. Thus, these trailers need to be capable of handling a fairly significant load mass.

Unfortunately, one of the drawbacks of ground level loading trailers is the lack of structural support provided by the frame and chassis. This weakness reflects the need to design the frame and suspension so that the trailer bed can lower to the ground between the wheels, which means most designs eliminate some conventional cross-supports and the wheel axle. Thus, a need exists to provide a strong suspension system for ground level loading trailers that can support hauling heavy equipment.

Attempts to provide a ground level loading trailer without disadvantages has proved elusive. For examiner, U.S. Pat. No. 8,191,922 provides a modern drop-bed trailer with a guide mechanism that includes a cable system with cable tension device and a pulley block. While the guide mechanism used permits adjustment of the trailer bed height on unlevel surfaces, the design adds complexity and likely adds to the cost of manufacture. Another prior art trailer includes independently pivotal wheel carrying support arms connected to a trailer frame by a half leaf spring, wherein each support arm is pivotal by a respective cable winch. Another common type of ground level loading trailer uses a U-shaped axle and a frame mounted by leaf springs to the axle. The leaf springs on this commons type of trailer wear because of the increased torsion caused by the U-shaped frame, as the wheels are supported by the leaf springs rather than a transverse axle. The wear on the leaf springs cause premature tire wear. A modification of this type of trailer provides an air suspension system instead of leaf springs. However, the air suspension system is high maintenance and requires expensive components.

Thus a need exists to provide a ground loading trailer with an improved suspension system that decreases tire wear and cost of manufacture.

SUMMARY OF THE INVENTION

The present invention provides a torsion slide suspension that improves on existing suspension systems for ground loading trailers, especially the type of ground level loading trailer having a U-shaped trailer frame with a drop deck. The torsion slide suspension presented herein is less expensive to manufacture than common air suspension systems and does not lead to increased tire wear like that caused by leaf spring suspensions on similar trailers.

The trailer frame supports the drop deck. The drop deck moves within the trailer frame and includes hydraulics attached between the trailer frame and the deck for supporting and lowering and raising the deck. The trailer frame includes a side frame member having at least one wheel well on each side of the trailer. Each wheel well defined by the side frame members includes slide channels for receiving slides. A torsion slide suspension is supported by the slide channels on each side of the trailer frame in combination with a rubber spring on top of the torsion slide suspension. Each torsion slide suspension supports a wheel of the trailer by an axle. The suspension includes a top member for attachment of the rubber spring that bears against the upper portion of the wheel well. The suspension further includes an upper cross member to which the top member is attached. The suspension includes a lower cross member. The upper and lower cross members are connected by a tower. The tower includes the tire axle attached thereto. Opposing ends of the upper and lower cross members are connected by vertical side members of the suspension frame. At least one slide is attached to each vertical member. The slides on opposing vertical members engage the opposing slide channels in the side portions of the wheel wells.

One object of the present invention is to improve the suspension of ground level loading trailers.

Another object of the invention is to reduce wear on tires in ground level loading trailers by reducing torsion as generally experienced in prior leaf spring trailers of this type.

And still another object of the present invention is to provide a torsion slide suspension that is simple and elegant and inexpensive to manufacture, while being inexpensive to maintain.

DETAILED DESCRIPTION OF THE INVENTION

Figure 1:
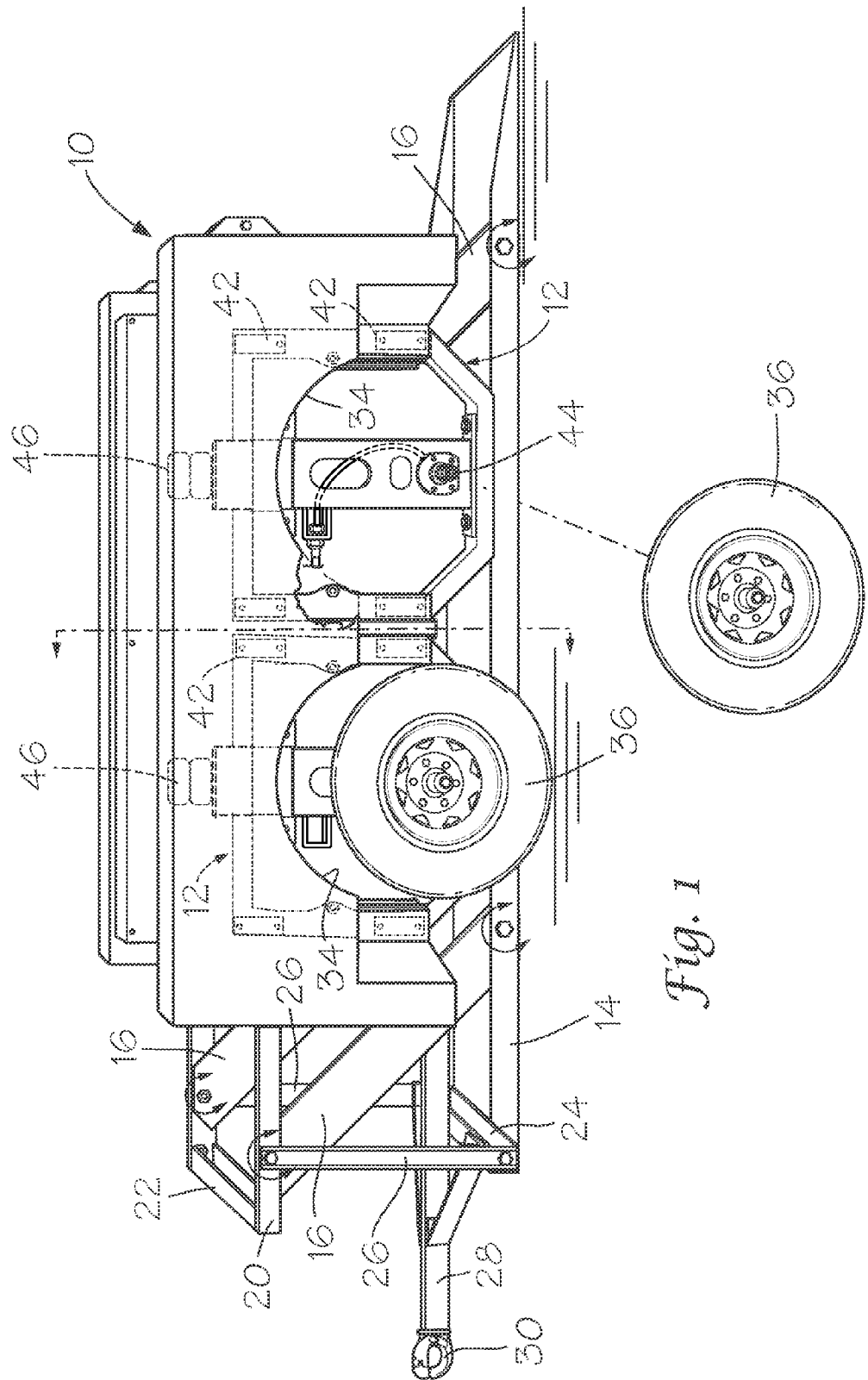
FIG. 1 is a side perspective view of a ground loading trailer with torsion slide suspension in accordance with an exemplary embodiment of the invention.

Referring now to the drawings, FIG. 1 illustrates a ground level loading trailer 10, referred to herein as the "trailer." The trailer 10 includes a torsion slide suspension 12, referred to herein as the "suspension", in accordance with a preferred embodiment of the present invention. The trailer includes a hydraulic drop deck 14. A trailer with a drop deck that moves to ground level is ideal for carrying equipment with low ground clearance or poor traction such as scissor lifts, industrial sweepers, landscaping equipment, pavers, rollers, and compactors. Also, a low angle ramp at ground level allows for easier loading with a handcart or dolly rather than pulling a load up a steep angle ramp. Such trailers with a drop deck usually include the convenience of enclosed sides for carrying equipment or supplies. When the drop deck is used, the entire deck 14 is lowered to ground level for loading and then lifted to a transport position for traveling.

A hydraulic mechanism is used to lower the entire deck of the trailer to ground level. This eliminates the need to drive, pull, winch, or push a payload up or down a loading ramp and may provide for faster, safer and more efficient loading in some applications. In FIG. 1, the drop deck 14 is attached to a trailer frame by hydraulically controlled arms 16 and may further include vertical supports that move upward and downward or support the vertical movement of the deck 14. The trailer frame is U-shaped in that it includes a forward cross-member 18 for structural support and elongate side frame members 20. The side frame members extend rearward from each opposite end of the forward cross-member 18 and form the sides of the trailer 10. The hydraulically controlled arms 16 connect to side frame members. According to the preferred design, the arms may also attach to the forward cross-member. The forward cross-member may include an upper forward cross-member 22 and a lower forward cross-member 24, which form a front side of the trailer 10. Vertical members 26 connect the upper forward cross-member and a lower forward cross-member on each end.

In the embodiment shown, a structurally reinforced tongue extension 28 extends forward from the lower forward cross-member 24. The tongue extension 28 includes a hitch 30 so that the tongue extension can be connected to a hitch (not shown) on a towing vehicle (not shown) that fits the hitch on the tongue extension and may be clamped or otherwise secured thereto for towing.

The opposing elongate side frame members 20 forming each side of the trailer frame each include at least one structurally formed wheel well 34 forming a portion of the respective side frame member. Each wheel well accommodates a wheel 36 and suspension 12 for the trailer 10. In particular, each wheel well includes a receptacle for a spring shaft and includes opposing spaced vertical slide channels 40. The slide channels are integrated into the structure of the side frame members 20 within the wheel well 34 portion and vertically oriented to receive slides 42.

Figure 2:
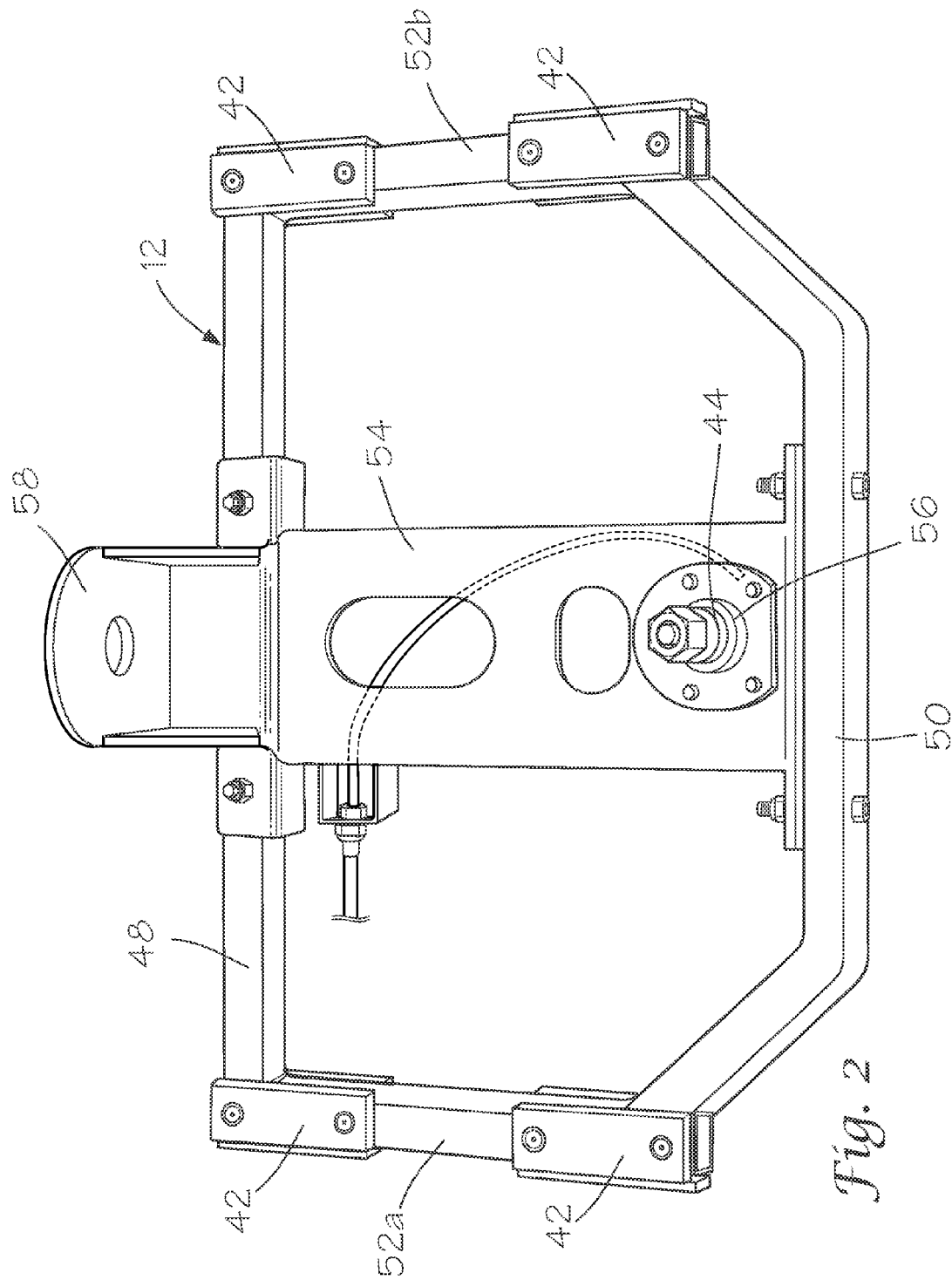
FIG. 2 is a side perspective view of a torsion slide suspension for ground loading trailers in accordance with an embodiment of the invention.
Figure 3:
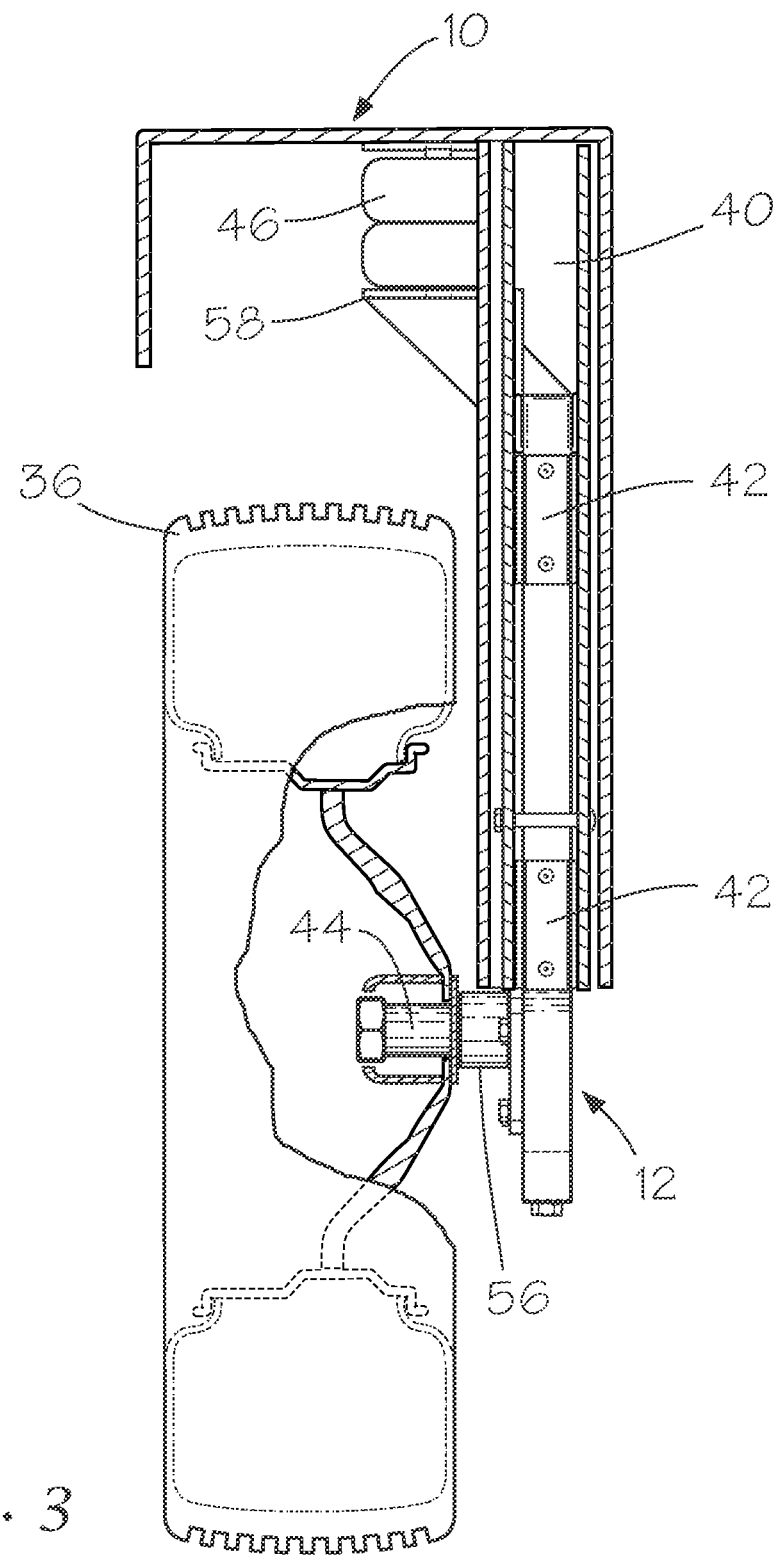
FIG. 3 is sectional cut-away end view of a torsion slide suspension and trailer as shown in FIG. 1.

A torsion slide suspension 12 shown in FIG. 2 includes at least one slide 42 on each side that engage the slide channels 40 in the side frame members 20. The torsion slide suspension 12 supports the wheels 36 of the trailer 10. In particular, a torsion frame portion of the torsion slide suspension forms a structural support for an axle 44, a rubber spring 46, and slides 42. In the preferred embodiment, the torsion frame includes tubular steel members 48, 50, 52a, 52b on the top, bottom and sides, forming a generally square or rectangular frame. The corner portions of the torsion frame may be angled as shown in FIG. 2. A vertical tower 54 connects the bottom of the torsion frame to the top of the torsion frame and forms an integral structural portion of the torsion frame. A bearing 56 is inserted into the tower 54 and attached thereto for the trailer wheels 36 to turn on the axle 44. Accordingly, the axle is attached to the tower via the bearing, and a wheel is attached to each axle on either side of the trailer 10. A horizontal suspension plate 58 is attached to the top of the tower and horizontally and perpendicularly extends from the tower. The suspension plate includes a hole 60 defined within the plate for receiving a spring shaft. At least one rubber spring 46 is loaded on the shaft and supported by the suspension plate 58. As shown in FIG. 3, a pair of rubber springs 46 is loaded on the shaft and suspension plate. The rubber springs bear against the bottom surface of the receptacle for the spring shaft in the wheel well 34.

Referring again to FIG. 2, a pair of slides 42 is attached to each side of each torsion frame in the preferred embodiment shown. The slides 42 are screwed or bolted onto the side tubular frame portions 52a, 52b of the torsion frame. The slides may be removed and replaced as needed after excess wear, providing a simple and inexpensive means for coping with torsion forces applied on ground level loading trailers that usually results in costly repairs in prior leaf spring or air suspension systems. However, excess wear will not occur frequently because of advantages of the present design. In an exemplary embodiment, the slides 42 comprise thermoplastic polyethylene, in particular ultra-high-molecular-weight polyethylene (UHMWPE, UHMW). UHMW is also known as high-modulus polyethylene or high-performance polyethylene and provides a tough material with characteristics that will provide an improved suspension for ground level loading trailers. In particular, UHMW has high impact strength, is resistive to corrosive chemicals, is self-lubricating, and is high resistant to abrasion while having a low coefficient of friction. These characteristics have been found through experimentation and application to the design of a torsion slide suspension to provide a solution that resists premature wear and tear. The slides may comprise a unitary member, a sleeve or three-sided sleeve or may comprise three sectional plates forming the three sides of the slide as shown in FIG. 2.

The slides 42 on each side of the torsion frame insert into the opposing slide channels 40 in the side frame members 20 of the trailer frame as shown in FIG. 3. The slide channels 40 extend vertically the length of the inner sidewall of the wheel well 34 so that the slides 42 can move up and down within the slide channels. Bolts may be inserted and attached near the bottom of the slide channels to retain the slides and torsion frame in the slide channels and prevent the slides from extending beyond the bottom of the slide channels.

The combination of the slides and the rubber springs retain the torsion slide suspension within the wheel well of the trailer's side frame. Vertical movement of the suspension is controlled by the rubber springs while horizontal, lateral and twisting movement of the suspension is controlled by the slides within the slide channels. Thereby, the wheels are suspended in a manner that provide a good quality ride for the trailer while still being easy to maintain and low cost to manufacture. In maintaining the suspension, the rubber springs can easily be replaced or shimmed when necessary, and the slides can be removed and replaced as discussed above. The torsion slide suspension includes an opening defined in the tower to receive a brake line as shown in FIG. 2 for attachment to the brake that is incorporated with axle and bearing supporting each wheel.

The detailed description describes a simple and elegant solution to the problem of torsion and wear and tear suspension systems in ground level trailers. The claims that follow will set forth the invention and the variations encompassed by the claims.

The invention claimed is:
1. A ground level loading trailer comprising:
   a trailer frame having a forward cross-member and elongate side frame members that extend rearward from respective opposite ends of the forward cross-member and form sides of the trailer;
   a hydraulically controlled drop deck supported by the trailer frame;
   at least one wheel well defined by a portion of the side frame members and each wheel well including a receptacle for a spring shaft and including opposing spaced vertical slide channels, wherein the slide channels are integrated into the structure of the side frame members within each said wheel well;
   a torsion slide suspension having at least one slide on each side that each engage the respective slide channel and having a rubber spring, whereby the torsion slide sus- pension supports a wheel on an axle that is attached to the torsion slide suspension by a bearing.

* * * * *